United States Patent
Moireau et al.

(12) 
(10) Patent No.: US 6,187,435 B1
(45) Date of Patent: Feb. 13, 2001

(54) SIZING COMPOSITION FOR GLASS STRANDS, PROCESS USING THIS COMPOSITION AND RESULTING PRODUCTS

(75) Inventors: Patrick Moireau, Curienne; Anne L'her, Chambery, both of (FR)

(73) Assignee: Vertrotex France, Chambery (FR)

( * ) Notice: Under 35 U.S.C. 154(b), the term of this patent shall be extended for 0 days.

(21) Appl. No.: 08/849,741

(22) PCT Filed: Oct. 29, 1996

(86) PCT No.: PCT/FR96/01693

§ 371 Date: Sep. 8, 1997

§ 102(e) Date: Sep. 8, 1997

(87) PCT Pub. No.: WO97/17304

PCT Pub. Date: May 15, 1997

(30) Foreign Application Priority Data

Nov. 7, 1995 (FR) .................................................. 95 13128
Jan. 5, 1996 (FR) .................................................. 96 00067

(51) Int. Cl.$^7$ ....................................................... D02G 3/00
(52) U.S. Cl. ....................... 428/378; 427/386; 427/389.8; 428/388; 428/426; 428/436
(58) Field of Search .................................. 427/386, 389.8; 428/378, 388, 476, 436

(56) References Cited

U.S. PATENT DOCUMENTS

| | | | |
|---|---|---|---|
| 4,104,434 | * | 8/1978 | Johnson . |
| 4,283,322 | * | 8/1981 | Temple ........................ 260/29.6 WB |
| 5,352,392 | | 10/1994 | Johnson et al. . |
| 5,486,416 | | 1/1996 | Johnson et al. . |
| 5,601,882 | | 2/1997 | Augier et al. . |
| 5,611,836 | | 3/1997 | Moireau et al. . |

\* cited by examiner

*Primary Examiner*—Bernard Pianalto
(74) *Attorney, Agent, or Firm*—Oblon, Spivak, McClelland, Maier & Neustadt, P.C.

(57) ABSTRACT

The present invention relates to a sizing composition for glass strands composed of a solution with a viscosity of less than or equal to 400 cP comprising less than 5% by weight of solvent and comprising at least one thermally polymerizable base system, the said base system comprising at least 60% by weight of components with a molecular mass of less than 750 and comprising at least 60 % by weight of a mixture:

of component(s) exhibiting at least one epoxy reactive functional group, and of component(s) exhibiting at least one anhydride reactive functional group.

The invention also relates to a process using this composition and to the strands obtained according to this process and coated with the said composition.

21 Claims, No Drawings

SIZING COMPOSITION FOR GLASS STRANDS, PROCESS USING THIS COMPOSITION AND RESULTING PRODUCTS

BACKGROUND OF THE INVENTION

1. Field of the Invention

The present invention relates to a sizing composition for glass strands, this composition reacting to heat. The present invention also relates to a process for the production of reinforcing glass strands using this composition as well as to the glass strands obtained and to the composites produced from the strands.

In the continuation of the text, "polymerization", "to polymerize", "polymerizable" and the like are understood to mean "polymerization and/or crosslinking", "to polymerize and/or to crosslink", "polymerizable and/or crosslinkable" and the like respectively.

2. Description of the Background

Reinforcing glass strands are manufactured in a known way from molten glass streams flowing from die orifices. These streams are drawn in the form of continuous filaments and then these filaments are gathered into base strands, which are then collected.

Before they are gathered together in the form of strands, the filaments are coated with a size by passing over a sizer device. This deposition is necessary for the production of the strands and makes it possible to combine them with other organic and/or inorganic materials to produce composites.

The size serves, in the first place, as lubricant and protects the strands from the abrasion resulting from the high-speed friction of the strands over various devices during the abovementioned process.

The size can also ensure, in particular after polymerization, the integrity of the abovementioned strands, that is to say the binding of the filaments to one another within the strands. This integrity is in particular sought after in textile applications where the strands are subjected to strong mechanical stresses. Indeed, if the filaments show little attachment to one another, they break more readily and disrupt the operation of the textile machinery. Strands that do not exhibit integrity are moreover regarded as difficult to handle.

The size also facilitates the wetting and/or the impregnation of the strands by materials to be reinforced and helps in the creation of bonds between the said strands and the said materials. The mechanical properties of the composites obtained from the material and the strands depend in particular on the quality of the adhesion of the said material to the said strands and on the ability of the said strands to be wetted and/or to be impregnated by the said material.

The sizing compositions used must be sufficiently stable and compatible with the drawing rates of the filaments which have to pass through them (several tens of meters per second). They must in particular resist the shearing induced by the passage of the filaments and properly wet their surface at the said rates. In the case where they thermally polymerize, they must exhibit a reaction temperature which is sufficiently high to remain stable at the die. It is also desirable for these compositions to exhibit, after polymerization, a maximum degree of conversion (this degree corresponding to the ratio of the level of functional groups which have reacted in the size after heat treatment to the level, in the size, before heat treatment of reactive functional groups capable of reacting), in order to guarantee in particular that sized strands of constant quality are obtained (a size exhibiting a degree of conversion which is much below the theoretical degree expected being capable of changing overtime).

The majority of sizes currently used are aqueous sizes which are easy to handle but which have to be deposited in large amounts on the filaments in order to be effective. The water generally represents 90% by weight of these sizes (in particular for reasons of viscosity), which necessitates the drying of the strands before they are used as reinforcers, it being possible for the water to be harmful to the good adhesion between the strands and the materials to be reinforced. These drying operations are lengthy and expensive, must be adapted to the manufacturing conditions of the strands and their efficiency is not always optimum. When they are carried out during the fibre-drawing operation (that is to say before collecting the strands obtained by gathering together the filaments), on the filaments (WO 92/05122) or on the strands (U.S. Pat. No. 3,853,605), they require the installation of drying devices at each die and when they are carried out on the strand wound packages, they bring about risks of uneven and/or selective migration of the components of the size within the wound packages (aqueous sizes already having a tendency to spread themselves unevenly over the strands because of their nature) and optionally phenomena of colouring of the strands or of deformation of the wound packages. The deformation of the wound packages is also observed, in the absence of drying, on straight-edged wound packages (rovings) of fine strands (that is to say exhibiting a "count" or "mass per unit length" of 300–600 tex (g/km) or less) coated with aqueous sizes.

A few exceptional patents describe non-aqueous sizes but these sizes generally involve organic solvents which are problematic to handle and which can, because of their toxicity, harm the health of people in the vicinity and/or pose problems of viscosity which it is appropriate to solve by heating these sizes (U.S. Pat. No. 4,604,325) or by adding suitable agents (U.S. Pat. No. 4,609,591). These sizes also often require the installation of specific devices below each die; it is in particular necessary, when the strands are collected in the form of wound packages, to treat the strands before obtaining the wound packages in order to prevent the turns of each wound package from sticking to one another, this sticking phenomenon making it difficult to unwind the strands. These treatments, the effectiveness of which depends on the operating conditions, consist, for example, in polymerizing the size by subjecting the sized strands to the effect of ultraviolet radiation in order to confer on them a satisfactory integrity and to make it possible to handle them (U.S. Pat. No. 5,049,407). The polymerized size, however, prevents the filaments from sliding with respect to one another, this absence of mobility resulting in the shattering, by mechanical degradation of the size, of the strands when they are cut and it being possible for this absence of mobility to cause problems in textile applications where the strands used must both exhibiyt integrity and be flexible.

SUMMARY OF THE INVENTION

The subject of the present invention is an improved sizing composition which does not exhibit the abovementioned disadvantages, this composition being intended to coat glass strands and being capable of polymerizing under the effect of heat, this composition making it easy to handle the sized strands, even before polymerization, and conferring on them a flexibility compatible with their subsequent treatments, this composition conferring good integrity on the strands after polymerization and exhibiting a high degree of conversion, this composition in addition efficiently protecting the strands from abrasion, conferring on them the possibility of being combined with various materials to be reinforced for the purpose of producing composite items exhibiting good mechanical properties, being particularly stable, in particular at the die, and being compatible with the drawing rates of the filaments.

Another subject of the present invention is an improved process for the manufacture of sized glass strands as well as sized glass strands which are easy to handle and which exhibit improved characteristics, the said strands being capable of efficiently reinforcing organic and/or inorganic materials for the preparation of composites.

The sizing composition according to the invention is composed of a solution with a viscosity of less than or equal to 400 cP comprising less than 5% by weight of solvent and comprising a thermally polymerizable base system, the said base system comprising at least 60% by weight of components with a molecular mass of less than 750 and comprising at least 90% by weight of a mixture:

of component(s) exhibiting at least one epoxy reactive functional group, and of component(s) exhibiting at least one anhydride reactive functional group.

The invention also relates to a process for the production of sized glass strands according to which a multiplicity of molten glass streams, flowing from a multiplicity of orifices arranged at the base of one or a number of dies, is drawn in the form of one or a number of sheets of continuous filaments and then the filaments are gathered together in one or a number of strands which are collected on a moving support, the said process comprising the deposition at the surface of the filaments, during drawing and before gathering together the filaments into strands, of the sizing composition defined above.

The invention further relates to strands coated with a size exhibiting the composition defined above and/or obtained according to the process mentioned above.

DETAILED DESCRIPTION OF THE INVENTION

Subsequently, "epoxy component(s)" and "anhydride component(s)" is understood to mean "component(s) exhibiting at least one epoxy reactive functional group" and "component(s) exhibiting at least one anhydride reactive functional group" respectively.

In the composition according to the invention, the possible solvents are essentially organic solvents necessary for dissolving certain polymerizable compounds. The presence of these solvents in a limited amount does not require specific treatments to remove them; in the majority of cases, the sizes according to the invention are, moreover, entirely free of solvent, that is to say of compounds which act solely as solvent in the solution.

Due to its low viscosity (less than or equal to 400 cP and preferably less than or equal to 200 cP), the sizing composition according to the invention is compatible with the conditions for producing glass strands imposed by the direct process, the viscosity of the composition being chosen as a function of the drawing rate and of the diameter of the filaments caused to pass through it. The composition according to the invention also exhibits a wetting rate on the strand Compatible with the drawing rate of the strands.

"Thermally polymerizable base system" according to the invention should Be understood as meaning the compound or compounds essential to the sizing And having the essential function of participating in the structure of the polymerized size, these compounds being capable of thermally polymerizing. As a general rule, the base system represents between 60 and 100% by weight of the sizing composition according to the invention, mainly between 70 and 99.5% by weight of the composition and, in the majority of cases, between 75 and 90% by weight of the composition.

The base system is mostly composed (preferably from 80% by weight and up to 100% by weight in the majority of cases) of epoxy component(s) and of anhydride component (s), the use of this mixture of components making it possible to obtain, after polymerization, epoxy-anhydride (polyester) copolymers as the major participants in the structure of the polymerized size, the properties of the sized strands depending directly on this structure.

In addition, the base system comprises a majority (preferably at least 70–75% by weight and up to 100% by weight) of component(s) with a molecular mass of less than 750, this/these component(s) normally mostly (and in the majority of cases, entirely) forming part of the abovementioned epoxy and anhydride components.

Preferably and in general according to the invention, the components with a molecular mass of less than 750 mentioned above have molecular masses of less than 500. Likewise, in the majority of cases according to the invention and preferably, these components are monomers (mono- or polyfunctional, as explained subsequently) but the base system can also comprise components with a molecular mass of less than 750 in the form of oligomers or of polymers containing partially polymerized functional groups.

According to certain embodiments, the base system according to the invention can optionally comprise a small proportion of component(s) participating in the structure of the polymerized size but not exhibiting epoxy or anhydride functional groups and/or exhibiting a higher molecular mass.

According to the preferred embodiment of the invention which makes it possible to obtain particularly satisfactory results, the base system is composed solely of components exhibiting at least one epoxy or anhydride reactive functional group and/or, optionally, is composed solely of components with a molecular mass of less than 750.

The epoxy or anhydride components which can be used in the base system can exhibit one (monofunctional components) or a number of identical reactive functional groups (polyfunctional components) among epoxy and anhydride functional groups.

The epoxy component or components of the base system can be in particular one or a number of the following components: alkyl glycidyl ether with a $C_4$–$C_{16}$ aliphatic chain or the like; cresyl- or phenyl- or nonylphenyl- or p-tert-butylphenyl- or 2-ethylhexyl-glycidyl ether and the like; limonene epoxide; cyclohexene monoxide; glycidyl ester of versatic acid or of neodecanoic acid; and the like (the above components being monofunctional components); 1,4-butanediol or neopentyl glycol or resorcinol or cyclohexanedimethanol or 1,6-hexanediol or dibromoneopentyl glycol diglycidyl ether and the like; diepoxidized derivative of bisphenols A or F; 3,4-epoxycyclohexylmethyl 3,4-epoxycyclohexanecarboxylate; bis(3,4-epoxycyclohexyl) adipate, polyglycol diepoxide; diglycidyl ester of hexahydrophthalic anhydride; diglycidylhydantoin; 2-(3,4-epoxycyclohexyl)-5,5-spiro-(3,4-epoxycyclohexyl)-m-dioxane, vinylcyclohexene dioxide; trimethylolethane or trimethylolpropane or trisphenylolmethane triglycidyl ether and the like; triglycidyl ether of palm oil; triglycidyl ether of para-aminophenol; tetra(para-glycidoxyphenyl)ethane; 4,4'-(diglycidylamino)diphenylmethane; polyglycidyl ether of an aliphatic polyol, epoxidized polybutadiene; epoxycresol novolak or epoxyphenol novolak resin; triglycidyl isocyanurate; N,N,N',N'-tetraglycidyl-α,α'-bis(4-aminophenyl)- or N,N,N',N'-tetraglycidyl-α,α'-bis(4-amino-3,5-dimethylphenyl)-p-diisopropylbenzene and the like; and the like (these components being polyfunctional components).

As a general rule according to the invention, the proportion of epoxy component(s) of the base system is between 15 and 85% by weight of the sizing composition, mainly between 25 and 70% by weight approximately of the sizing composition. In the majority of cases, it is between 35 and 60% by weight of the sizing composition.

The anhydride component or components of the base system can be in particular one or a number of the following components: methylbicyclo[2.2.1]heptene-2,3-dicarboxylic anhydride; hexahydrophthalic anhydride; dodecylsuccinic anhydride; phthalic anhydride; 1,4,5,6,7,7-hexachlorobicyclo[2.2.1]hept-5-ene-2,3-dicarboxylic anhydride; endo-cis-bicyclo[2.2.1]heptene-2,3-dicarboxylic anhydride; tetrachlorophthalic anhydride; pyromellitic dianhydride; 1,2,3,4-cyclopentanetetracarboxylic dianhydride; polyazelaic polyanhydride; polysebacic anhydride; glutaric anhydride; or alternatively other polyester anhydride; bromo- or dibromophthalic anhydride; cyclic sulphopivalic anhydride; bicyclodicarboxylic anhydride; diphenoxyphosphinylsuccinic anhydride; anhydride of 2-alkyleneglutaric acid; poly(cycloaliphatic anhydride); styrene-maleic anhydride; cyclooctadiene-maleic anhydride; perchlorocoumalin-maleic anhydride; myrcene monoepoxide-maleic anhydride; cyclohexadiene-dicarboxylic-maleic anhydride; poly(cyclopentadienyl)-maleic anhydride; trimellitic anhydride derivative (bistrimellitic anhydride of neopentyl glycol, product of the acidolysis of a tricarboxylic anhydride and of an ester or of an amine, oxyalkylated derivative of trimellitic anhydride); anhydride of phenylenebis(3-butanedicarboxylic acid); dianhydride of benzophenone-tetracarboxylic acid; dianhydride of phenylalkyl-pentanetetracarboxylic acid; dianhydride of alkyl-substituted tricyclodecanecarboxylic acid; dianhydride of dicarboxytetrahydronaphthalenesuccinic acid; and the like.

As a general rule according to the invention, the proportion of anhydride component(s) of the base system is between 5 and 65% by weight of the sizing composition, mainly between 10 and 55% by weight approximately of the composition. In the majority of cases, it is between 15 and 45% by weight of the sizing composition.

Preferably, according to the invention, the components of the base system and their levels (or rates or amounts) within the base system are chosen so that the ratio r of the number of anhydride reactive sites to the number of contrasting epoxy reactive sites is between 0.2 and 6 (an epoxy functional group counting as one epoxy reactive site and an anhydride functional group counting as two anhydride reactive sites), so as to make possible satisfactory polymerization of the sizing composition, in particular by formation of epoxy-anhydride (polyester) copolymers, during the polymerization heat treatment. In the majority of cases according to the invention, this ratio r is between 0.3 and 4 and, preferably, it is greater than 0.4 and less than or equal to 2.0 approximately, so as to promote the formation of more stable epoxy-anhydride copolymers of diester type (the formation of copolymers of monoester type not, however, being excluded when the ratio r is greater than 1 and it being possible for the formation of copolymers of monoester type to exhibit advantages in the reinforcement of certain matrices).

In one embodiment of the invention, the sizing composition comprises, in addition to the base system, at least one specific catalyst which promotes the polymerization of the size under the effect of heat by facilitating the opening of the anhydride and/or epoxy functional groups, mainly in the case where the anhydride component or components of the base system have little reactivity and/or optionally in the case where the base system is devoid of cycloaliphatic epoxy components. This catalyst is preferentially chosen from amino derivatives, such as trialkylamines, hexamethylenetetramine, aniline/formaldehyde condensation products, substituted aniline/aliphatic aldehyde (anhydrobutyraldehyde/toluidine) condensates, epoxyamines (N-(2,3-diepoxypropyl)aniline), basic tertiary amines, N,N-dialkylalkanolamines, amino salts of polyacids, quaternary ammonium salts, quaternary imidazoline salts, dicyanodiamide, and the like, or from derivatives of boron and of phosphorus, such as ammonium organoboron salts, trialkanolamine borates, fluoroborates, organosubstituted phosphines, and the like, or from metal derivatives, such as tin tetrachloride ($SnCl_4$), divalent tin salts, metal chelates containing epoxide groups, magnesium, barium, zinc or cadmium oxides, and the like, or alternatively from alcohols.

The polymerization of the epoxy and anhydride components can also be initiated by the presence of water (even in the form of traces), by the hydroxyl or carboxyl groups of components of the size (presence, for example, of hydrolysed silanes), by the moisture in the surrounding air, and the like. In the absence of catalyst(s) as defined above, the ratio r is in addition generally less than 3 and preferably less than 2.

The level of specific components defined above which act solely as catalysts in the sizing composition is less than 3% by weight of the sizing composition, in the majority of cases less than 1% by weight and, preferably, is less than or equal to 0.5% by weight of the sizing composition. The presence of a catalyst which promotes the opening of the anhydride components makes it possible to use less reactive anhydrides and to lower the polymerization temperature of the size, as explained subsequently. In the case of highly reactive anhydride components, such as phthalic anhydride, maleic anhydride or succinic anhydride, the presence of a catalyst is, in contrast, generally avoided.

In addition to the base structure and the specific catalyst (s), the composition according to the invention can comprise additives in small amounts, these additives giving specific properties to the sizing composition but not being essential participants in the structure of the size, in contrast to the base system. Even if these additives are to be distinguished from the base system, they may nevertheless be thermally polymerizable, like the compounds of the base system.

The composition according to the invention can thus comprise, as additive, at least one coupling agent which makes it possible to attach the size to the glass, the proportion of the coupling agent or agents being between 0 and 25% by weight of the size and preferably being less than or equal to 20% by weight of the size. These agents can be one or a number of the following components: silanes, such as γ-glycidoxypropyltrimethoxysilane, γ-methacryloyloxypropyltrimethoxysilane, polyethoxylated-propoxylated trimethoxysilane, γ-acryloyloxypropyltrimethoxyilane, vinyltrimethoxysilane, phenylaminopropyltrimethoxysilane, and the like; or titanates, zirconates, siloxanes, and the like.

The composition according to the invention can also comprise, as additive, at least one film-forming agent which acts solely as slip agent and which facilitates fibre-drawing, in proportions of between 0 and 10% by weight and preferably less than or equal to 5% by weight. The presence of this agent or agents prevents significant friction of the filaments on the sizing device when the filaments are drawn at a high rate (more than 40 m/s) and/or when they are very fine, these agents being, however, expensive and it being possible for these agents to result in a diminution in the mechanical characteristics of the composites. These fibre-drawing agents can be one or a number of the following components: silicones, siloxanes or polysiloxanes, such as glycidyl(n)polydimethylsiloxane, α,ω-acryloyloxypolydimethylsiloxane, and the like, silicone derivatives, such as silicone oils, and the like.

The composition according to the invention can also comprise, as additive, at least one textile processing agent acting essentially as lubricant, in proportions of between 0 and 15% by weight and preferably of between 0 and 8% by weight. These textile agents can be one or a number of the following components: fatty esters (optionally ethoxylated or propoxylated), glycol derivatives (in particular of ethylene or of propylene glycol), such as isopropyl or cetyl palmitates, isobutyl stearates, decyl laurates, ethylene glycol adipates, polyethylene glycols or polypropylene glycols with a molecular weight of less than 2000, isopropyl stearates, and the like.

The size can also comprise, as additive, at least one agent for adapting to the materials to be reinforced, in the case of cement materials in particular.

The sizing composition according to the invention efficiently protects the strands from abrasion, is stable, in particular at the die (the composition according to the invention not truly polymerizing before 100° C. and being subjected at the die to temperatures not exceeding 70° C.), is compatible with the drawing rates of the filaments and does not require recourse to a drying operation before polymerization or recourse to a specific treatment between the deposition on the strand and the operation of collecting the sized strands.

Moreover, when the composition according to the invention is deposited on the filaments during drawing, it spreads out very quickly over the whole of their surface and forms a true protective film for each of them. The strand obtained by gathering together the filaments and which is coated with the thermally untreated composition (that is to say not yet polymerized) is thus composed of a bundle of sheathed filaments which can slide over one another, this strand then exhibiting high flexibility, which is particularly advantageous in the case where this strand is intended to be cut, the sheathing of the filaments in addition offering additional protection against abrasion. Such a strand does not exhibit integrity in the ordinary meaning of the term, that is to say that it is not composed of filaments attached to one another by virtue in particular of an adhesive binding caused by one or a number of constituents of the size, such as can be caused by sticking film-forming agents present in significant amounts in a size. Despite this, this strand coated with the not yet polymerized composition is easy to handle and, when it is wound in the form of wound packages, can easily be extracted from the wound packages without having subjected the size beforehand to a polymerization treatment. The strands coated with the not yet polymerized sizing composition have, moreover, a very good aptitude towards wetting and towards impregnation by materials to be reinforced, it thus being possible for the impregnation to take place more rapidly (gain in productivity) and the composites obtained thus exhibiting a more homogeneous appearance and some improved mechanical properties.

The integrity proper of the strands by adhesive binding of the filaments constituting them is obtained after polymerization of the sizing composition by the effect of heat. This integrity is sought for with respect to the strands which have to be subjected to strong mechanical stresses, for example in textile applications (the ratio r of the composition is preferentially between 0.5 and 2 approximately when the strands are intended to be woven), or, if appropriate, after cutting, with respect to the cut strands intended to reinforce organic and/or inorganic materials. It is preferable, in such cases, to carry out the polymerization of the size before, respectively, using the strands in textile applications or combining the cut strands with a material to be reinforced.

The integrity obtained after polymerization of the size is particularly important whereas the level of size on the strands is relatively low (the loss on ignition of the strands coated with the sizing composition and/or obtained according to the process of the invention not exceeding 3% by weight). The amount of sizing composition which has to be deposited on the strands in order to be effective is advantageously not important and makes it possible, however, to obtain strands exhibiting very good characteristics, including integrity (the integrity obtained being high even for levels of size on the filaments of the order of 0.6% by weight).

The sizing composition according to the invention also exhibits, after polymerization, a maximum degree of conversion, the degree of conversion of the anhydride components being, for example, close to 100% when the ratio r is less than approximately 1.

Moreover, it is observed, surprisingly, that properties such as the tensile strength of the strands according to the invention are better, after the beginning of ageing in a humid environment, than those obtained before ageing of the strands.

The strands according to the invention can advantageously be combined with various materials to be reinforced for the purpose of producing composite items exhibiting good mechanical properties. The composition according to the invention makes the strands particularly compatible with the materials to be reinforced, in particular with organic materials and in particular epoxy materials but also with inorganic materials such as cement materials. It also makes possible the impregnation of the sized strands by the material to be reinforced. This composition is particularly suitable for the production of continuous strands collected in the form of rovings, cakes, cops, mats, and the like or for the production of cut strands, these different strands being composed of filaments with a diameter which can range from 5 to approximately 24 microns. The sizing composition according to the invention is in particular suited to the production of fine strands (with a count of less than 600 tex) collected in the form of rovings, in contrast to conventional aqueous sizes.

The sizing composition according to the invention is advantageously deposited during the process according to the invention on filaments intended to be collected into strands and is then polymerized under the effect of a heat treatment, the said treatment taking place independently of the fibre-drawing operation (devices thus not being necessary below each die) and it being possible for the said treatment to be carried out at different stages of the process after fibre-drawing.

The heat treatment can in particular be carried out on the collected strands or during the preparation of a composite by combining the sized strands with an organic material. In the case where the strands obtained are collected in the form of wound packages, the heat treatment can be carried out on the strand wound packages prior to the use of the strands, in particular in textile applications. If the heat treatment is carried out with respect to the strand wound packages before unwinding the strands, it is desirable for the strand turns constituting the said wound packages to exhibit a crossing angle at least equal to 1.50 in order to prevent adhesive bonding between turns via the polymerized size, these adhesive bondings making it difficult to unwind the strands.

The strands obtained after gathering together the filaments can also be collected on receiving supports in translational motion. They can indeed be projected, by a device which is also used to draw them, towards the collecting surface moving transversely to the direction of the projected strands, for the purpose of obtaining a sheet of intermixed continuous strands, known as a "mat", in which case the heat treatment can be carried out on the strands spread out over the collecting surface. If appropriate, a binder (it being possible for this binder optionally to comprise and to bring to the size the catalyst(s) mentioned above) may have been projected onto the mat before heat treatment of the combination and the heat treatment may make it possible to polymerize the binder and the size at the same time.

The strands can also be cut before collecting by a device which is also used to draw them, the cut strands being collected on receiving supports in translational motion, in which case the heat treatment is preferentially carried out with respect to the cut strands spread out over the receiving supports.

The treatment times for strands collected in the form of rovings weighing several kilograms are at least 1 hour at temperatures greater than approximately 140° C., preferably of the order of 160° C., when the strands are coated with a composition according to the invention not comprising specific catalyst(s) (a high temperature promoting the formation of more stable compounds), the treatment time varying according to the shape and the weight of the roving and most of this time being dedicated to raising the temperature of the mass of glass contained in the wound package. When the strands coated with a composition according to the invention not comprising specific catalyst (s) are collected on one or a number of supports in translational motion and when the heat treatment is carried out on the support or supports, the treatment time is of the order of 15 to 20 minutes at temperatures generally greater than approximately 140° C. The treatment temperature, whatever the method of collecting the strands, can be lowered by a few tens of degrees (it can decrease by 10 to 30° C. for example and be between 120 and 140° C. approximately) and the treatment time reduced when the composition coating the strands comprises at least one specific catalyst as mentioned above.

The strands can also be collected without being subjected to heat treatment, the heat treatment being carried out subsequently. In particular, the strands can be collected in the form of wound packages and can then be extracted from the said wound packages in order to be subjected to additional treatments (for example in order to be cut by a device which is also used to carry them along mechanically), it being possible for the heat treatment to be carried out on the strands before, during or after the additional treatment or treatments (in particular, for the cutting, the heat treatment can be carried out on the device for collecting the cut strands, and the like).

The sized strands can also be collected without having been heat-treated and can then be heat-treated after combining with an organic material during the preparation of a composite, the said material optionally comprising at least one catalyst as mentioned above. Depending on the organic material used, the heat treatment can be accompanied by a treatment with ultraviolet radiation, by a treatment with an electron beam, and the like. The heat treatment time during the preparation of a composite is generally at least 2 hours, at temperatures greater than approximately 130° C. and preferably of the order of 180–200° C.

The glass strands coated with the size according to the invention and/or obtained according to the process of the invention are coated with a non-polymerized size or with a size polymerized after heat treatment. These strands exhibit a loss on ignition advantageously of less than 3% by weight and preferably of less than 1.5%. The small amount of size deposited on the strand makes it possible to greatly reduce the problems of adhesive bonding between strands, in particular when they are collected in the form of wound packages, also makes possible better opening of the strand during impregnation by a material to be reinforced and is economically advantageous.

The strands obtained according to the invention are easy to handle and can, after collecting, be found in different forms which may or may not require additional stages of treatment of the strands, these stages being carried out before or after the heat treatment and/or the collecting of the strands. The glass strands can thus be provided in the form of continuous strands, of cut strands, may have been combined in the form of braids, tapes, mats or networks, which may or may not be woven, and the like. The strands according to the invention exhibit in particular good tensile strength properties.

The composites advantageously obtained by combining at least glass strands according to the invention and at least one organic and/or inorganic material (the level of glass within these composites generally being between 30 and 70% by weight) exhibit good mechanical properties, as illustrated in the examples below.

Other advantages and characteristics of the invention will become apparent in the light of the following examples giving, by way of illustration but without implied limitation, sizing compositions according to the invention and characteristics of the strands coated with these compositions or characteristics of the composites comprising the said strands.

EXAMPLE 1

Filaments with a diameter of 14 microns obtained by drawing molten glass streams according to the process of the invention are coated with the size with the following composition, expressed as percentages by weight:

Components of the base system with a molecular mass of less than 750:

| Components of the base system with a molecular mass of less than 750: | |
| --- | --- |
| Trimethylolpropane triglycidyl ether[1] | 34.0% |
| Diglycidyl ether of 1,4-butanediol[2] | 18.4% |
| 1,2-Epoxyhexadecane[3] | 29.1% |
| Methyltetrahydrophthalic anhydride[4] | 10.0% |

-continued

| Catalyst: | |
|---|---|
| 1-Methylimidazole[5] | 0.5% |
| Additives: | |
| Polyethoxylated alkylsilane coupling agent[6] | 8.0% |

The filaments are gathered together into strands, which are wound in the form of rovings exhibiting an approximate mass of 13.5 kg, and then the rovings are heated at 140° C. for 6 hours.

The strands are then extracted from the wound packages in order to measure their tensile strength and their tenacity at break under the conditions defined by ISO Standard 3341. The results on 8 to 10 test specimens (with the standard deviations shown in brackets) are reported in the appended Comparative Table I, which also gives the count and the loss on ignition of the strands obtained.

EXAMPLE 2

Filaments with a diameter of 14 microns obtained according to the invention are coated with the size with the following composition (percentages by weight):

Components of the base system with a molecular mass of less than 750:

| Components of the base system with a molecular mass of less than 750: | |
|---|---|
| 3,4-Epoxycyclohexylmethyl 3,4-epoxycyclohexane-carboxylate[7] | 28% |
| Mixture based on vinylcyclohexene monoxide[8] | 28% |
| Mixture of phthalic anhydride, of hexahydrophthalic anhydride and of tetrahydrophthalic anhydride[9] | 28% |
| Additives: | |
| γ-Methacryloyloxypropyltrimethoxysilane coupling agent[10] | 10% |
| Isopropyl palmitate textile agent | 6% |

The ratio r in this composition is 0.7 and this composition exhibits a viscosity of 64 cP at 20° C.

The filaments are gathered into strands, which are wound in the form of rovings exhibiting an approximate mass of 13.5 kg. The strands thus collected are not heat-treated.

Composite panels with parallel strands are prepared, in accordance with NF Standard 57152, from the strands obtained exhibiting a count of 320 tex. The reinforced resin is "Epoxy LY 556" resin sold under this reference by the company Ciba-Geigy, to which are added, per 100 parts by weight of epoxy resin, 90 parts of a curing agent sold under the reference "HY 917" by the company Ciba-Geigy and 0.5 parts of an accelerator sold under the reference "DY 070" by the company Ciba-Geigy.

The panels prepared are then heat-treated and the mechanical properties exhibited by these panels, with respect to flexion and shearing, are respectively measured according to ISO Standard 178 and ISO Standard 4585, before ageing and after immersion of these panels in water at 98° C. for 24 hours. The results obtained on 8 to 10 test specimens are reported in the appended Comparative Table II, which gives the type of resin used for the panels, the flexural strength at break for a level of glass adjusted to 100%, before and after ageing, and the shear strength at break before and after ageing. The standard deviations are shown in brackets.

EXAMPLE 3

The procedure is the same as in Example 2, the heat treatment, however, being carried out with respect to the strand wound packages and not with respect to the composite panels. The strand rovings obtained in Example 2 are thus heated, in the present example, at 160° C. for 8 hours. No deformation of these rovings is observed. The results obtained with respect to composite panels in the present example are reported in Table II.

The tensile strength and tenacity at break of the heat-treated strands extracted from the wound packages are also measured, as in Example 1. The results are reported in Table I.

EXAMPLE 4

Filaments with a diameter of 14 microns obtained according to the invention are coated with the size with the following composition (percentages by weight):

Components of the base system with a molecular mass of less than 750:

| Components of the base system with a molecular mass of less than 750: | |
|---|---|
| 3,4-Epoxycyclohexylmethyl 3,4-epoxycyclohexane-carboxylate[7] | 25.0% |
| Diglycidyl ether of 1,4-butanediol[2] | 10.0% |
| 2-Ethylhexyl glycidyl ether[11] | 20.0% |
| Methyl-5-norbornene-2,3-dicarboxylic anhydride[12] | 36.5% |
| Catalyst: | |
| 1-Methylimidazole[5] | 0.5% |
| Additives: | |
| Polyethoxylated alkylsilane coupling agent[6] | 8.0% |

The ratio r in this composition is 1.3 and this composition exhibits a viscosity of 72 cP at 20° C.

The filaments are gathered together into strands, which are wound in the form of rovings weighing approximately 13.5 kg, and are then heated at 160° C. for 6 hours. The tensile strength and tenacity at break of the strands are then measured, as in Example 1 (Table I). The resistance to abrasion of the strands is also evaluated by weighing the amount of flock formed after passing the strands over a series of rods. For different strands coated with the polymerized size described in the present example, the amount of flock on conclusion of the test is of the order of 1 mg per kg of strand tested.

By way of comparison, strands coated with an aqueous size based on an emulsion containing epoxy resin, silanes and surfactants, these strands being dried according to normal methods, can form 200, indeed 500, mg of flock per kg of strand.

EXAMPLE 5

Filaments with a diameter of 10 microns obtained according to the invention are coated with the size with the following composition (percentages by weight):

Components of the base system with a molecular mass of less than 750:

| Components of the base system with a molecular mass of less than 750: | |
|---|---|
| Diglycidyl ether on a novolak phenol base[13] | 25.0% |
| Diglycidyl ether of 1,4-butanediol[2] | 10.0% |
| 2-Ethylhexyl glycidyl ether[11] | 16.5% |
| Methyltetrahydrophthalic anhydride[4] | 40.0% |
| Catalyst: | |
| 1-Methylimidazole[5] | 0.5% |
| Additives: | |
| Polyethoxylated alkylsilane coupling agent[6] | 8.0% |

The filaments are gathered together into strands, which are wound in the form of cakes weighing approximately 7 kg, and are then heated at 140° C. for 6 hours. The tensile strength and tenacity at break of the strands are then measured, as in Example 1 (Table I).

EXAMPLE 6

Filaments obtained according to the invention are coated with a size with the following composition (percentages by weight):
Components of the base system with a molecular mass of less than 750:

| Components of the base system with a molecular mass of less than 750: | |
|---|---|
| Trimethylolpropane triglycidyl ether[1] | 24% |
| 2-Ethylhexyl glycidyl ether[11] | 24% |
| Methyl-5-norbornene-2,3-dicarboxylic anhydride[12] | 40% |
| Additives: | |
| γ-Methacryloyloxypropyltrimethoxysilane coupling agent[10] | 12% |

The ratio r in this composition is 1.9.

The filaments are gathered together into strands, which are wound in the form of rovings. The collected strands are not heat-treated.

Composite panels are prepared from these strands, which are easily extracted from the wound packages obtained, in the same way as in Example 2 and are then heat-treated and the mechanical properties of these panels, measured under the same conditions as in Example 2, are reported in Table II.

EXAMPLE 7

The procedure is the same as in Example 6, use being made of an identical sizing composition but which comprises a lower level of coupling agent (11.6% instead of 12%) and which additionally comprises a catalyst in the form of a 2,4,6-tridimethylaminomethylphenol, sold under the reference "Protex NX3" by the company Protex, at levels of 0.4% by weight of the composition.
The results are reported in Table II.

EXAMPLE 8

Filaments obtained according to the invention are coated with the size with the following composition (percentages by weight):
Components of the base system with a molecular mass of less than 750:

| Components of the base system with a molecular mass of less than 750: | |
|---|---|
| Tetraglycidyl ether of 4,4'-diaminodiphenylmethane[14] | 20.0% |
| Cresyl glycidyl ether[15] | 15.0% |
| Diglycidyl ether of cyclohexane-dimethanol[16] | 8.0% |
| Methylhexahydrophthalic anhydride[17] | 42.0% |
| Catalyst: | |
| 2-Propylimidazole[18] | 0.3% |
| Additives: | |
| γ-Methacryloyloxypropyltrimethoxysilane coupling agent[10] | 8.7% |
| γ-Glycidoxypropyltrimethoxysilane coupling agent[19] | 6.0% |

The ratio r in this composition is 1.68.

The procedure is then as in Example 6, use being made in the composite panels prepared, in place of the epoxy resin, of a polyester resin "M 402", sold under this reference by the company Ciba-Geigy, to which are added, per 100 parts by weight of polyester resin, 20 parts of a softening agent sold under the reference "F 8010 C" by the company Ciba-Geigy, 16.5 parts of styrene and 1.5 parts of an accelerator sold under the reference "THM 60" by the company Ciba-Geigy.

The results are reported in Table II.

EXAMPLE 9

The procedure is the same as in Example 6, the sizing composition used being replaced by the following composition (percentages by weight):

Components of the base system with a molecular mass of less than 750:

| Components of the base system with a molecular mass of less than 750: | |
|---|---|
| Bisphenol A diglycidyl ether[20] | 21.0% |
| Cresyl glycidyl ether[15] | 25.0% |
| Methylhexahydrophthalic anhydride[17] | 42.0% |
| Catalyst: | |
| Organometallic amine in polyglycols[21] | 0.4% |
| Additives: | |
| γ-Methacryloyloxypropyltrimethoxysilane coupling agent[10] | 11.6% |

The ratio r in this composition is 1.98.

The procedure is then as in Example 6. The results are reported in Table II.

EXAMPLE 10

Filaments obtained according to the invention are coated with the size with the following composition (percentages by weight):

Components of the base system with a molecular mass of less than 750:

| Components of the base system with a molecular mass of less than 750: | |
|---|---|
| Diglycidyl ether of cyclohexanedimethanol[16] | 10.0% |
| 2-Ethylhexyl glycidyl ether[11] | 14.0% |
| Methylhexahydrophthalic anhydride[17] | 40.0% |

Components of the base system with a molecular mass greater than 750:

| Components of the base system with a molecular mass greater than 750: | |
|---|---|
| Triglycidyl ether on an aliphatic polyol base with an average molecular mass of 1950[22] | 20.0% |
| Catalyst: | |
| 2-Propylimidazole[18] | 0.4% |
| Additives: | |
| g-Methacryloyloxypropyltrimethoxysilane coupling agent[10] | 11.6% |
| Isopropyl palmitate textile agent | 4.0% |

The ratio r in this composition is 2.96.

The filaments are gathered together into strands, which are wound in the form of rovings, and are then heated at 145° C. for 8 hours. The tensile strength and tenacity at break of the strands are then measured as in Example 1 (Table I).

Composite panels are prepared from the strands obtained, which are easily extracted from the wound packages, in the same way as in Example 3, use being made, however, as resin, in place of the epoxy resin LY 556, of an epoxy resin "CY 205", sold under this reference by the company Ciba-Geigy, to which are added, per 100 parts by weight of epoxy resin, 32 parts by weight of a curing agent sold under the reference "HT 972" by the company Ciba-Geigy.

The mechanical properties of the panels obtained are measured as in Example 2, before ageing and after immersion of the panels in water at 98° C. for, this time, 72 hours (Table II)

EXAMPLE 11

The procedure is as in Example 2, use being made of an identical sizing composition but which comprises a lower level of 3,4-epoxycyclohexylmethyl 3,4-epoxycyclohexanecarboxylate (9.3% instead of 28%), a lower level of the mixture based on vinylcyclohexene monoxide (18.7% instead of 28%) and a higher level of the mixture of phthalic anhydride, of hexahydrophthalic anhydride and of tetrahydrophthalic anhydride (58% instead of 28%). The ratio r in this composition is 2.84 and this composition exhibits a viscosity of 76 cP at 20° C.

The results are reported in Table II.

EXAMPLE 12

The procedure is as in Example 3, the sizing composition explained in Example 11 being used.

The results are reported in Tables I and II.

The resistance to abrasion of the strands is also measured as in Example 4. The amount of flock weighed on conclusion of the test is 99 mg per kg of strand.

EXAMPLE 13

Filaments with a diameter of 14 microns obtained according to the invention are coated with the size with the following composition (percentages by weight):

Components of the base system with a molecular mass of less than 750:

| Components of the base system with a molecular mass of less than 750: | |
|---|---|
| 3,4-Epoxycyclohexylmethyl 3,4-epoxycyclohexane-carboxylate[7] | 9.25% |
| Mixture based on vinylcyclohexene monoxide[8] | 9.25% |
| Mixture of phthalic anhydride, of hexahydrophthalic anhydride and of tetrahydrophthalic anhydride[9] | 55.5% |
| Additives: | |
| γ-Methacryloyloxypropyltrimethoxysilane coupling agent[10] | 20% |
| Isopropyl palmitate textile agent | 6% |

The ratio r in this composition is 4.19 and this composition exhibits a viscosity of 62 cP at 20° C.

The filaments are gathered together into strands, which are wound in the form of rovings weighing approximately 13.5 kg, and are then heated at 160° C. for 8 hours. The tensile strength and tenacity at break of the strands are then measured, as in Example 1 (Table I).

The resistance to abrasion of the strands is also measured as in Example 4. The amount of flock weighed on conclusion of the test is 57 mg per kg of strand.

COMPARATIVE EXAMPLE

The mechanical characteristics of the composites obtained using the strands described in Examples 2, 3 and 6 to 12 are compared with the mechanical characteristics of the composites obtained using reference strands coated with an aqueous size based on an emulsion containing epoxy resin, silanes and surfactants, the latter composites being prepared in the same way as in Examples 8 (the heat treatment, however, being carried out with respect to the strand wound packages and not with respect to the composite panels) and 10 (the heat treatment of the strands being, however, carried out at a higher temperature) respectively, and the mechanical properties of the latter composites, measured as in Examples 2 and 10 respectively, being reported in Comparative Table II.

It is observed, in the preceding examples, that the strands coated with size according to the invention are easy to handle, whether or not they had been heat-treated, and exhibit good tensile strength properties. Remarkably and advantageously, the tensile strength properties of the strands coated with size according to the invention are better after the beginning of ageing in a humid environment than those obtained before ageing of the sized strands.

The strands obtained according to the invention moreover exhibit a low loss on ignition and good resistance to abrasion and make it possible to efficiently reinforce organic and/or inorganic materials.

The low levels of flock obtained during the tests of resistance to abrasion of the strands and the good tensile strength properties of the strands also make it possible to say that the strands obtained according to the invention exhibit good integrity. The strands obtained also give good texturing results.

The strands coated with size according to the invention moreover make it possible to obtain composites exhibiting mechanical properties which are as good as those of the composites obtained from strands coated with conventional aqueous sizes.

The glass strands according to the invention can be used in various applications, for example in textile applications, such as the manufacture of warps by warping, or directly in reinforcing applications, such as the reinforcement of organic materials (for example plastics) or inorganic materials (for example cement materials), in order to obtain composite products.

(1) Sold under the reference "Heloxy 5048" by the company Shell
(2) Sold under the reference "Heloxy 67" by the company Shell
(3) Sold under the reference "UVR 6216" by the company Union Carbide
(4) Sold under the reference "HY 917" by the company Ciba-Geigy
(5) Sold under the reference "DY 070" by the company Ciba-Geigy
(6) Sold under the reference "Silquest A 1230" by the company OSI
(7) Sold under the reference "UVR 6110" by the company Union Carbide
(8) Sold under the reference "UVR 6200" by the company Union Carbide
(9) Sold under the reference "HY 905" by the company Ciba-Geigy
(10) Sold under the reference "Silquest A 174" by the company OSI
(11) Sold under the reference "Heloxy 116" by the company Shell
(12) Sold under the reference "HY 906" by the company Ciba-Geigy
(13) Sold under the reference "Araldite PY 307" by the company Ciba-Geigy
(14) Sold under the reference "Araldite MY 722" by the company Ciba-Geigy
(15) Sold under the reference "Heloxy 62" by the company Shell
(16) Sold under the reference "Heloxy 107" by the company Shell
(17) Sold under the reference "HY 1102 BD" by the company Ciba-Geigy
(18) Sold under the reference "Actiron NXJ 60" by the company Protex
(19) Sold under the reference "Silquest A 187" by the company OSI
(20) Sold under the reference "Araldite GY 250" by the company Ciba-Geigy
(21) Sold under the reference "DY 071" by the company Ciba-Geigy
(22) Sold under the reference "Heloxy 84" by the company Shell

COMPARATIVE TABLE I

|  | Ex. 1 | Ex. 3 | Ex. 4 | Ex. 5 | Ex. 10 | Ex. 12 | Ex. 13 |
|---|---|---|---|---|---|---|---|
| Count (tex) | 320 | 320 | 320 | 84 | 320 | 320 | 320 |
| Loss on ignition (%) | 0.93 | 0.58 | 0.82 | 0.56 | 0.42 | 0.39 | 0.40 |
| Tensile strength at break (kgf) | 16.5 | 18.2 | 19.0 | 4.7 | 17.2 | 18.7 | 18.1 |
| σ | (0.8) | (1.1) | (0.7) | (0.2) | (0.6) | (0.8) | (1.4) |
| Tenacity (g/tex) | 48.6 | 57.8 | 57.0 | 53.3 | 53.6 | 55.2 | 56.1 |
| σ | (2.3) | (3.4) | (2.0) | (2.8) | (2.0) | (2.3) | (4.4) |

COMPARATIVE TABLE II

|  | Ex. 2 | Ex. 3 | Ex. 6 | Ex. 7 | Ex. 8 | Ex. 9 | Ex. 10 | Ex. 11 | Ex. 12 | Comparative Ex. | Comparative Ex. |
|---|---|---|---|---|---|---|---|---|---|---|---|
| Resin used | Epoxy | Epoxy | Epoxy | Epoxy | Polyester | Epoxy | Epoxy | Epoxy | Epoxy | Polyester | Epoxy |
| Flexural strength at break for 100% glass (MPa) |  |  |  |  |  |  |  |  |  |  |  |
| *Before ageing | 2341 | 2122 | 2207 | 2361 | 2268 | 2274 | 2022 | 2379 | 2334 | 2440 | 2280 |
| σ | (65) | (62) | (46) | (63) | (68) | (66) | (83) | (43) | (49) | (70) | (40) |
| *After ageing | 2241 | 1767 | 1822 | 1758 | 1406 | 1883 | 1408 | 2211 | 1977 | 1370 | 1400 |
| σ | (89) | (65) | (29) | (81) | (38) | (69) | (67) | (99) | (85) | (40) | (20) |
| Shear strength at break (MPa) |  |  |  |  |  |  |  |  |  |  |  |
| *Before ageing | 64.7 | 86.0 | 56.0 | 69.4 | 59.8 | 48.8 | 56.3 | 85.1 | 68.6 | 56.5 | 69.5 |
| σ | (1.0) | (0.5) | (0.9) | (0.8) | (0.4) | (0.8) | (0.9) | (1.4) | (1.8) | (1.0) | (1.0) |
| *After ageing | 42.3 | 72.1 | 49.4 | 50.8 | 28.6 | (49.0) | 41.2 | 64.7 | 49.0 | 25.0 | 40.0 |
| σ | (5.1) | (1.3) | (1.3) | (1.4) | (0.2) | (0.5) | (0.7) | (2.1) | (1.6) | (0.5) | (0.4) |

What is claimed is:

1. Glass strand coated with a sizing composition composed of a solution with a viscosity of less than or equal to 400 cP comprising less than 5% by weight of solvent and comprising at least one thermally polymerizable and/or crosslinkable base system, the said base system comprising at least 60% by weight of components with a molecular mass of less than 750 and comprising at least 60% by weight of a mixture:
   of component(s) exhibiting at least one epoxy reactive functional group,
   and of component(s) exhibiting at least one anhydride reactive functional group.

2. Glass strand according to claim 1, wherein the base system represents between 60 and 100% by weight of the sizing composition.

3. Coated glass strand obtained by thermally polymerizing the glass strand coated with a sizing composition according to claim 2.

4. Glass strand according to claim 1, wherein the composition additionally comprises at least one catalyst which facilitates the opening of the anhydride or epoxy functional groups under the effect of heat.

5. Coated glass strand obtained by thermally polymerizing the glass strand coated with a sizing composition according to claim 4.

6. Glass strand according to claim 1, wherein the composition additionally comprises at least one film-forming agent in proportions of between 0 and 10% by weight.

7. Coated glass strand obtained by thermally polymerizing the glass strand coated with a sizing composition according to claim 6.

8. Glass strand according to claim 1, characterized in that the base system is composed solely of components exhibiting at least one epoxy reactive functional group and components exhibiting at least one anhydride reactive functional group.

9. Coated glass strand obtained by thermally polymerizing the glass strand coated with a sizing composition according to claim 8.

10. Glass strand according to claim 1, wherein the composition additionally comprises at least one coupling agent in proportions of between 0 and 25% by weight.

11. Coated glass strand obtained by thermally polymerizing the glass strand coated with a sizing composition according to claim 10.

12. Glass strand according to claim 1, wherein the composition additionally comprises at least one textile agent in proportions of between 0 and 15% by weight.

13. Coated glass strand obtained by thermally polymerizing the glass strand coated with a sizing composition according to claim 12.

14. Coated glass strand obtained by thermally polymerizing the glass strand coated with a sizing composition according to claim 1.

15. Composite comprising at least one organic and/or inorganic material and sized glass strands, wherein the composite comprises at least in part sized glass strands according to claim 14.

16. Composite comprising at least one organic and/or inorganic material and sized glass strands, wherein the composite it comprises at least in part sized glass strands according to claim 1.

17. Sizing composition for a glass strand composed of a solution with a viscosity of less than or equal to 400 cP comprising less than 5% by weight of solvent and comprising at least one thermally polymerizable and/or crosslinkable base system, the said base system comprising at least 60% by weight of components with a molecular mass of less than 750 and comprising at least 60% by weight of a mixture:

of component(s) exhibiting at least one epoxy reactive functional group, and of component(s) exhibiting at least one anhydride reactive functional group.

18. Process for the production of sized glass stands according to which a multiplicity of molten glass streams, flowing from a multiplicity of orifices arranged at the base of one or a number of dies, is drawn in the from of one or a number of sheets of continuous filaments and then the filaments are gathered together in one or a number of strands which are collected on a moving support, the said process comprising the deposition at the surface of the filaments, during drawing and before gathering together the filaments into strands, of a sizing composition composed of a solution with a viscosity of less than or equal of 400 cP comprising less than 5% by weight of solvent and comprising at least one thermally polymerizable and/or crosslinkable base system, the said base system comprising at least 60% by weight of components with a molecular mass of less than 750 and comprising at least 60% of weight of a mixture:

of component(s) exhibiting at least one epoxy reactive functional group, and of component(s) exhibiting at least one anhydride reactive functional group.

19. Process according to claim 18, wherein the strands are collected in the form of wound packages on a rotating support, the crossing angle of the wound packages being at least equal to 1.5°.

20. Process according to claim 18, wherein the sizing composition is subjected to a heat treatment during or after collecting the strands coated with the said composition.

21. Process according to claim 18, wherein the sized strands collected are brought into contact with an organic material to be reinforced, before subjecting the combination to a heat treatment, so as to obtain a composite.

* * * * *

UNITED STATES PATENT AND TRADEMARK OFFICE
CERTIFICATE OF CORRECTION

PATENT NO. : 6,187,435 B1 Page 1 of 1
DATED : February 13, 2001
INVENTOR(S) : Moireau et al.

It is certified that error appears in the above-identified patent and that said Letters Patent is hereby corrected as shown below:

<u>Title page,</u>
Item [73], the Assignee's name is incorrectly listed. Item [73] should read as follows:

[73] Assignee: Vetrotex France, Chambery (FR)

Signed and Sealed this

Twentieth Day of November, 2001

Attest:

*Nicholas P. Godici*

NICHOLAS P. GODICI
*Attesting Officer* *Acting Director of the United States Patent and Trademark Office*

UNITED STATES PATENT AND TRADEMARK OFFICE
CERTIFICATE OF CORRECTION

PATENT NO. : 6,187,435 B1
DATED : February 13, 2001
INVENTOR(S) : Patrick Moireau et al.

It is certified that error appears in the above-identified patent and that said Letters Patent is hereby corrected as shown below:

Column 20,
Line 12, "glass stands" should read -- glass strands --;
Line 15, "in the from of" should read -- in the form of --;
Line 22, "equal of" should read -- equal to --.

Signed and Sealed this

First Day of October, 2002

Attest:

Attesting Officer

JAMES E. ROGAN
Director of the United States Patent and Trademark Office